United States Patent Office 3,446,810
Patented May 27, 1969

3,446,810
CAUSTIC FUSION OF POLYCYCLIC AROMATIC COMPOUNDS
Chi Kang Dien, Buffalo, and Walter Robert Demler, Hamburg, N.Y., assignors to Allied Chemical Corporation, New York, N.Y., a corporation of New York
No Drawing. Continuation of application Ser. No. 483,811, Aug. 30, 1965. This application Dec. 26, 1967, Ser. No. 693,677
Int. Cl. C09b *3/00;* C07d *51/80;* C07b *29/00*
U.S. Cl. 260—263                              22 Claims

ABSTRACT OF THE DISCLOSURE

An improved method for production of organic polycyclic compounds such as vat dyestuffs and pigments by caustic fusion of intermediate polycyclic compounds. The improvement resides in the use of a specific group of glycols and lower mono alkyl ethers thereof.

---

This is a continuation of our copending application Ser. No. 483,811 filed on Aug. 30, 1965 and now abandoned.

Numerous problems arise from the well-known caustic fusion procedures employed for the condensation and ring closure steps in the formation of dyes and their intermediates. To obtain complete reactions, high ratios of caustic flux to reactants are required together with high reaction temperatures maintained for long reaction periods. Such reaction conditions promote side reactions often resulting in the partial decomposition of one or both reactants and products, which gives rise to the need for tedious and expensive separation techniques to recover products of sufficient purity to be used in subsequent operations. Further, the requirements of high caustic to organic reactant ratios lowers the capacity of the equipment used. These difficulties tend to increase operating costs and to decrease yields in the manufacture of organic polycyclic compounds.

Some of these difficulties have been overcome in the specific preparation of violanthrone by caustic fusion of benzanthrone by employing alkyl ethers of ethylene glycol and diethylene glycol as solvents. Even this method is not totally satisfactory, however, for the reason that while the separation difficulties encountered upon completion of the fusion reaction when employing aniline, kerosene and other prior art solvents are substantially decreased, further purification such as vatting and/or bleaching treatments is still required to produce a violanthrone product suitable for use as a vat dye.

It has now been found that these and other problems encountered in caustic fusion reactions can be substantially reduced or eliminated by the employment of a unique group of solvents further defined herein below. Such solvents largely improve the fluidity of the fusion mass even when the reaction temperature is run at relatively low temperatures. The improved fluidity permits more efficient contact of the reacting molecules, thus allowing the reaction to go to completion in a short time. The use of highly fluid reaction masses at low reaction temperatures for relatively short reaction periods also serves to decrease side reactions and decompositions. Thus, both yield and purity of the products are improved.

It has been found, unexpectedly, particularly in the preparation of violanthrone, that the yield obtained by the improved process of our invention is practically theoretical and the purity of the product is generally such that no additional separation or purification step is required to obtain dyes suitable for use in the conventional vat dyeing processes.

It is an object of this invention to prepare polycyclic organic compounds by a caustic fusion process which provides for increased yields and quality of product while eliminating additional purification and separation steps.

It is another object of this invention to prepare polycyclic organic compounds by a caustic fusion process wherein the fusion mass is of improved fluidity even while the reaction is run at low temperatures thereby allowing for shorter reaction times and a more economical method of producing vat dyestuffs.

In accordance with the present invention, the production of polycyclic organic compounds by cyclization and dehydrogenation of organic intermediate compounds having a lesser number of ring members with the aid of caustic alkali, is effected by heating the organic intermediate polycyclic compound which is generally of the benzanthrone, anthraquinone and pyridone series, in the presence of a caustic alkali and a normally liquid polyalkylene glycol or mono-lower hydrocarbon alkyl ether thereof or alkyl ethers of propylene glycols, defined below, at a temperature sufficient to provide a fluid reaction mixture, e.g., within the range of about 125° C. and 350° C., preferably about 130 to 200° C., for a period of time sufficient to complete the cyclization of the said organic intermediate.

If desired, auxiliary solvents, e.g., lower alkanols, and oxidizing agents, such as sodium chlorate may be present also. The use of such auxiliary agents is well known in this art, and is described in the many patents and other literature references pertaining to the caustic fusion art to which this invention pertains.

The glycol solvents used in the process of our invention are liquids at ordinary temperatures and have the following general formulae:

(1) 

wherein R is hydrogen or methyl; A is hydrogen or a lower hydrocarbon alkyl radical containing from one to four carbon atoms and $x$ is an integer from 3 to 12; and (2)     $OH(CH_2CH_2CH_2O)xR$ wherein R is a lower hydrocarbon alkyl radical containing from one to four carbon atoms and $x$ is an integer from 1 to 2.

Typical compounds useful in this invention include:

Triethylene glycol,
Tetraethylene glycol,
Polyethylene glycols having average molecular weights up to about 600,
Polyethylene glycols having average molecular weights up to about 750.
(Polyalkylene glycols of this character are available as commercial products under the trade designation of "Carbowax" and "Polyglycol.")
Tripropylene glycol,
Methyl ether of triethylene glycol,
Methyl ether of n-propylene glycol,
Methyl ether of di-n-propylene glycol,
Methyl ether of tripropylene glycol (Dowanol TPM),
Methyl ethers of polyethylene glycol and similar ethyl, propyl, and butyl ethers of the abovementioned glycols.

Mixtures of these solvents together with equivalent materials are contemplated herein also.

The amount of such solvents used in the process of our invention is not critical and the optimum amount will vary somewhat according to the particular organic intermediate substance being reacted, the ratio of caustic alkali to said intermediate used, the temperature of the reaction selected, etc. as will be obvious to those skilled in this art. The effectiveness of the glycol solvents will vary among themselves and in the particular reaction also. In general, however, an amount (by weight) of the solvent which is about equal to the weight of the organic polycyclic compound being reacted should be used. Preferably from about two to about four parts by weight of the solvent per part by weight of the organic intermediate compound is used.

Because of its general effectiveness, ready availability and reasonable cost, we prefer to use the mixture of polyethylene glycols having an average molecular weight of about 200. Such a mixture of glycols is available commercially under the trade designation of Carbowax 200.

As is well known in this art, alcohols may be used, if desired, to reduce the viscosity of the fusion mixture. Any of the lower boiling alkanols may be used for this purpose, such as methanol, ethanol, propanol, isopropanol, butanols, pentanols, and the like. Usually these alkanols are employed in amounts up to about ⅓ the amount of glycol used. The exact amount is not critical and may be modified to obtain a practical fluidity of the fusion mixture at the reaction temperature.

Any of the conventional caustic alkalies or mixtures thereof may be used, such as potassium hydroxide, sodium hydroxide, sodium and potassium metal dissolved in alcohol, and their mixtures. Usually from 1.0 to 3.0 parts by weight of the alkaline agent per part by weight of the organic intermediate reactant are sufficient. The use of this low ratio of flux to reactant does not extend the time required to complete the reactions, but does reduce in many instances the tendency for side reactions to occur.

It is also conventional to include one or more oxidizing agents in certain cyclization reactions of the type disclosed herein. Practically any oxidizing agent suitable for use in caustic alkali media may be employed. Especially preferred is the use of sodium or potassium chlorate, although sodium or potassium nitrate is equally effective but is considered more dangerous to handle. The amount of oxidizing agent used may vary, depending upon whether or not air is admitted to the system. It is customary to use sufficient of the oxidizing agent to ensure rapid oxidation of the hydro compound.

In carrying out the cyclization in accordance with the improved process of the present invention, a mixture of the glycol type solvent and caustic alkali is prepared, to which the lower alkanol is added if desired. The mixture is agitated and heated to above about 125° C. at which time the oxidizing agent is added. The mass is agitated at the elevated temperature until a fluid homogeneous mass is obtained, after which the addition of the cyclizable organic intermediate, preferably in fine particulate form, is made, generally within about 5 to 60 minutes. The rapidity of the addition is controlled by the degree of foaming occasioned by the latter addition. Thereafter, the mixture is heated to the desired reaction temperature, generally within the range of about 135° to 200° C. and maintained thereat for a period generally five hours or less, during which period the cyclization and dehydrogenation is completed.

Thereafter the reaction mixture is treated in the conventional manner, e.g., it is diluted with water, aerated to complete the oxidation of the cyclized product, the resulting slurry is filtered and washed alkali-free. The resulting aqueous filter cake of cyclized polynuclear product is processed in the usual manner, generally without recourse to the usual purification treatment of vatting and/or bleaching, to produce the desired finished product.

The yield and quality of the resultant cyclized polynuclear products are at least equal to and generally superior to those obtained by the known caustic fusion procedures, wherein the ring closure step is effected in the presence of a large proportion of caustic alkali, in the presence or absence of one or more fluxing agents such as lower aliphatic alcohols, alkali metal salts of fatty acids or phenols, ethers or ethylene glycol, etc.

Typical examples of cyclizations benefited by the process of this invention are the following:

(A) Benzanthrone to violanthrone:

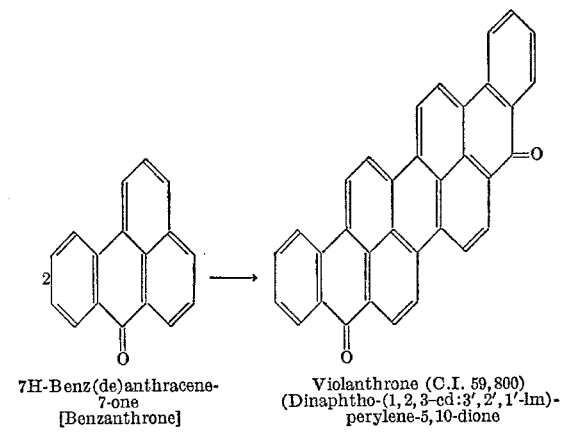

7H-Benz(de)anthracene-7-one [Benzanthrone]

Violanthrone (C.I. 59,800) (Dinaphtho-(1,2,3-cd:3′,2′,1′-lm)-perylene-5,10-dione)

(B) Ring closure of 2-aminoanthraquinone:

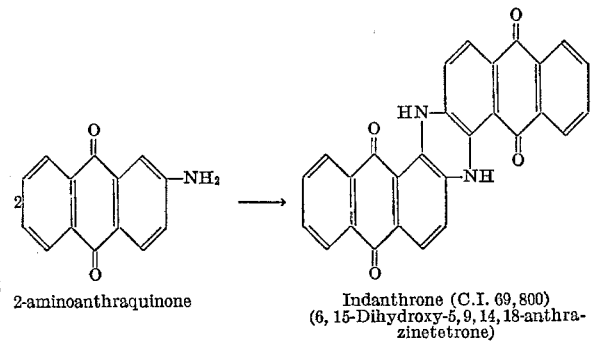

2-aminoanthraquinone

Indanthrone (C.I. 69,800) (6,15-Dihydroxy-5,9,14,18-anthrazinetetrone)

(C) The condensation of naphthalimide according to the following reaction:

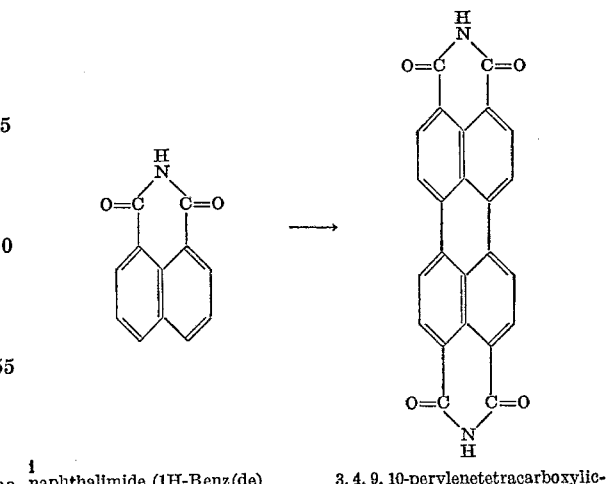

naphthalimide (1H-Benz(de) soquinoline-1, 3-(2H)-dione 3, 4, 9, 10-perylenetetracarboxylic-3, 4, 9, 10-dimide (C. I. 71, 130)

(D) Ring closure of bibenzanthronyl sulfide to produce isoviolanthrone:

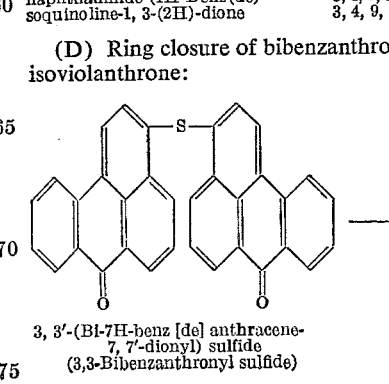

3, 3′-(Bi-7H-benz [de] anthracene-7, 7′-dionyl) sulfide (3,3-Bibenzanthronyl sulfide)

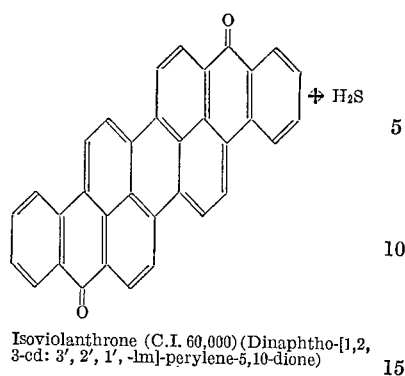

Isoviolanthrone (C.I. 60,000) (Dinaphtho-[1,2, 3-cd: 3', 2', 1', -lm]-perylene-5,10-dione)

(E) Ring closures with the elimination of water as shown by the following reaction:

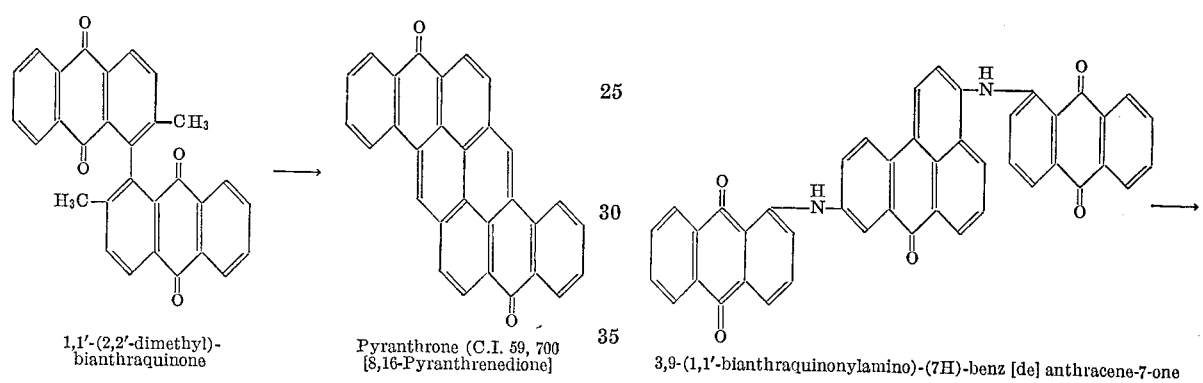

1,1'-(2,2'-dimethyl)-bianthraquinone

Pyranthrone (C.I. 59,700 [8,16-Pyranthrenedione]

(F) Preparation of flavanthrone with the elimination of water to effect ring closure:

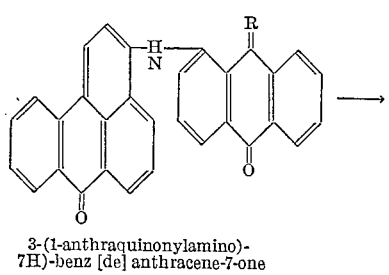

1,1'(2,2'-Diamino) bianthraquinone

Flavanthrone (C.I. 70,600)

(G) The cyclization of anthraquinonylamino benzanthrones according to the following equations:

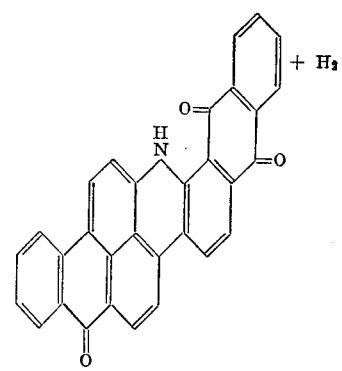

Anthra [2, 1, 9-m n a] naphth [2, 3-h] acridine-5, 10, 15-(16H) trione (C.I. 69,300)

(H)

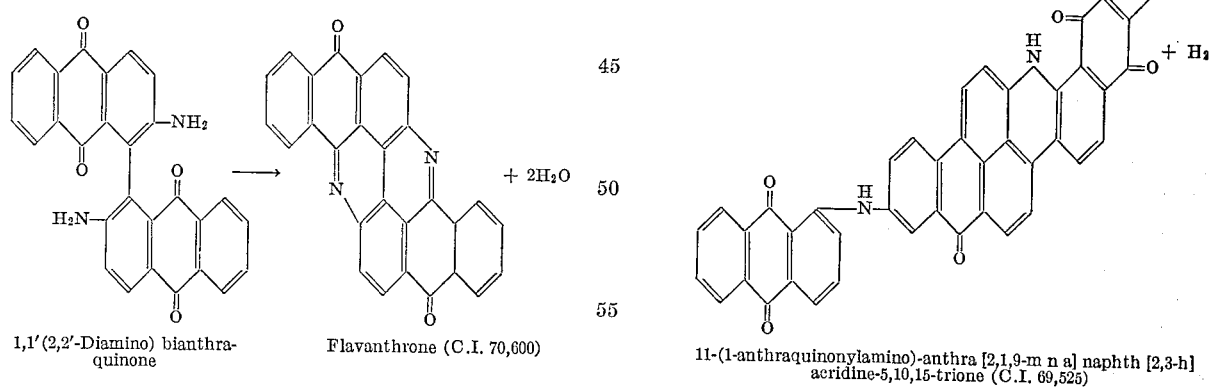

3,9-(1,1'-bianthraquinonylamino)-(7H)-benz [de] anthracene-7-one 11-(1-anthraquinonylamino)-anthra [2,1,9-m n a] naphth [2,3-h] acridine-5,10,15-trione (C.I. 69,525)

(I) Similar dehydrogenation reactions represented by the following equation:

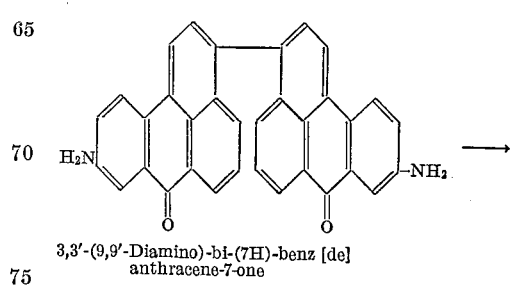

3-(1-anthraquinonylamino)-7H)-benz [de] anthracene-7-one 3,3'-(9,9'-Diamino)-bi-(7H)-benz [de] anthracene-7-one

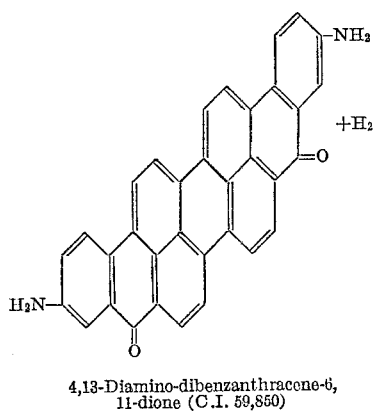

4,13-Diamino-dibenzanthracene-6,
11-dione (C.I. 59,850)

The system of numbering employed herein is that of "The Ring Index," Patterson and Cappell (1940).

Example I

To 112 grams of polyethylene glycol having an average molecular weight of 200 (Carbowax 200) and 25 ml. of methanol, 120 grams of powdered KOH were added. The mixture was agitated as its temperature was increased to 130° C., and 3.7 grams of $NaClO_3$ were added. Then 40 grams of sublimed benzanthrone were added over a period of about 5 minutes. The temperature was increased to about 145° C. and maintained thereat for 3 hours. The mixture was cooled slightly, diluted with 2 liters of water and agitated for 18 hours at room temperature. The mass was heated to 75° C., and filtered and the filter cake was washed alkali free.

Part of the filter cake was purified by diluting it with 2 liters of water and heating the mixture to 70° C., whereupon 62 ml. of a 50% NaOH solution and 38 grams of sodium hydrosulfite were added. The solution was held at 70° C. for 5 minutes and filtered to remove a small amount of insoluble sludge. The sludge was washed with a solution containing 30 ml. of 50% NaOH and 15 grams of sodium hydrosulfite in 2 liters of water until the filtrate was colorless. The combined filtrates were stirred and aerated for 18 hours. The mass was then heated to 75° C., and filtered and the filter cake was washed alkali free. Cotton dyeings were prepared from a dye paste made from the purified product.

A small aliquot of original filter cake was dried and weighed. The yield was indicated to be practically theoretical.

The rest of the original filter cake was made into a dye paste and used to dye cotton fabric, eliminating the purification steps usually employed for preparing these dyes such as the vatting illustrated above. The vat solubility, and the appearance and strength of the cotton dyeings prepared from this unpurified product were the same as obtained from the purified product. Thus the purification step was of no practical advantage in this case and therefore may be eliminated.

The product has the following probable structure:

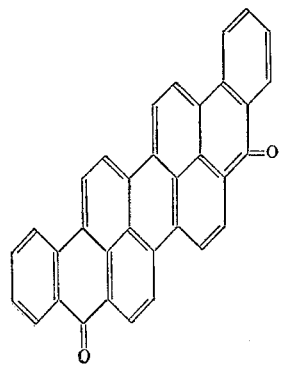

Violanthrone (C.I. 59,800)

Example II

Example I was repeated except that 112 grams of triethylene glycol were used instead of the polyethylene glycol, and 80 grams of sublimed benzanthrone were added to the fusion mixture. After 3½ hours of heating and stirring, the viscous fluid reaction mass was diluted with 1500 ml. of water, and air was bubbled through the mixture for 1 hour. The mixture was filtered and the filter cake was washed alkali free. An aliquot of the filter cake was dried and weighed, showing that a practically theoretical yield was obtained. The product, obtained without further purification, had a spectral strength of 102% of commercially available purified violanthrone, and dyeings prepared from a paste of this product has properties similar to those described in Example I.

Example III

Example I was repeated except that about 115 grams of tripropylene glycol were used as the solvent with 25 ml. of methanol. Then 140 grams of powdered KOH were added and the mixture was heated to 130° C. until the solution was complete. 5.0 grams of sodium chlorate were added with agitation and then 80 grams of benzanthrone. The temperature was maintained at 140° C. for 4 hours. After dilution, filtration, washing, and drying as described above, a practically theoretical yield of the desired product was obtained without subsequent purification. Properties of the product were the same as those described for the product obtained from Example I.

Example IV

Example I was repeated except that a polyethylene glycol having an average molecular weight of 300 (Carbowax 300) was used as the solvent with no alcohol dilution. With the same amount of KOH and oxidizing agent present, 40 grams of sublimed benzanthrone were condensed in approximately 4½ hours at a reaction temperature of 130° C. The yield was practically theoretical. The resulting dye, obtained without subsequent purification such as vatting or bleaching, was of excellent strength and possessed good fastness properties.

Example V

Example I was repeated except that the methyl ether of a polyethylene glycol having an average molecular weight of 350 (Carbowax 350) was used as the solvent. The condensation of 40 grams of benzanthrone was completed at 135° C. in 4 hours. A 96% yield of the theoretical value was obtained. The dye, obtained without subsequent purification, possessed good fastness properties.

Example VI

A run was attempted employing the process of Example I using 120 ml. of diethylene glycol as a solvent. When this solvent was mixed with 120 grams of KOH, a very thick mass was formed at 135° C., which did not become fluid even after the temperature was raised to 160° C. The experiment was discontinued.

Example VII

Similarly a run, employing the process of Example I, was attempted using 120 ml. of dipropylene glycol as the solvent. Again a very thick mass resulted, becoming solid at 140° C. The experiment was discontinued.

Example VIII

Example I was repeated using 120 ml. of ethylene glycol as the solvent. The reaction mass became thick when the benzanthrone was added. Eventually a thick, tarry ball formed which was only partially disintegrated with agitation. The final product was of poor quality being very weak tinctorially and therefore of no commercial value.

Example IX

A mixture containing about 61 grams of triethylene glycol, 19 ml. of methyl alcohol, and 90 grams of KOH was stirred and heated to 125° C. Then 40 grams of dibenzanthronyl sulfide was added over a period of 15 minutes and the stirring and heating were continued for 2 hours. After cooling, the mixture was diluted with 1500 ml. of water and stirred and aerated for 18 hours. After reheating to 95° C. and aeration for 3 hours, the hot mixture was filtered, washed alkali free, and dried. A yield equal to 97% of the theoretical was obtained without subsequent purification. The product had the probable structure:

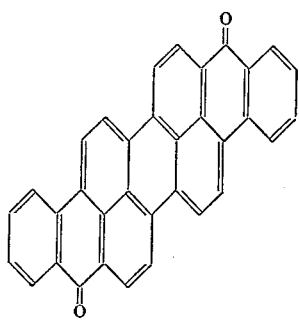

Isoviolanthrone (C.I. 60,000)

It possessed excellent dye strength and good fastness properties.

Example X

To a solution containing 112 grams of polyethylene glycol having an average molecular weight of 200, (Carbowax 200) and 20 ml. of methanol containing 5 ml. of water, 120 grams of powdered potassium hydroxide were added and the mixture was agitated and heated to 130° C. After solution was complete, 10 grams of sodium chlorate were introduced and then 45 grams of 2-aminoanthraquinone were added slowly over a period of about 30 minutes. The temperature was raised to 150° C., and maintained at 145° to 150° C. for 1½ hours. The thick paste was cooled slowly with the addition of small amounts of water, and finally diluted with 1500 ml. of water at room temperature. After agitation in air for 18 hours, the mixture was filtered and the precipitate was washed with warm water. The filter cake was reslurried in 1500 ml. of water at 50° C., and 90 ml. of 50% sodium hydroxide solution and 40 grams of sodium hydrosulfite were added. After 15 minutes, 75 grams of sodium chloride were added, and the solution was maintained at 50° C. for 1 hour. After filtering, the precipitate was washed with 500 ml. of water containing 25 grams of sodium chloride, 5 grams of sodium hydrosulfite, and 5 ml. of 50% sodium hydroxide. The filter cake was slurried in 1000 ml. of water at 50° C. and aerated for 2 hours. The mixture was then filtered and washed alkali free. The product was a blue precipitate, from which pastes were prepared suitable for dyeing cotton yarn in deep blue shades of excellent fastness properties. The product, indanthrone, had the following probable formula:

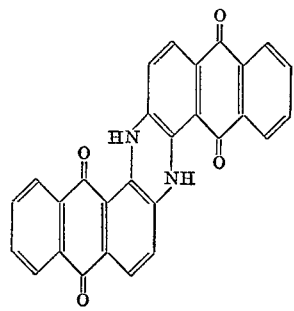

Indanthrone (C.I. 69,800)

Example XI

To a mixture of 112 grams of triethylene glycol and 25 ml. of methanol, 120 grams of powdered potassium hydroxide were added with agitation, and the mixture was heated to 135° C. Over a period of about 15 minutes, 40 grams of napthalimide were added with agitation and the temperature was raised to 200° C. The reaction was allowed to continue at this temperature for 45 minutes. The thickened mixture was then cooled to 160° C. and 200 ml. of water were added slowly over a period of about 10 minutes with agitation. The mixture was then further diluted to 1500 ml. and agitated for 18 hours at room temperature. After filtration, washing and drying a red-brown product was obtained, without subsequent purification, said product being known as 3,4,9,10-perylenetetracarboxylic-3,4,9,10-diimide having the following probable structure:

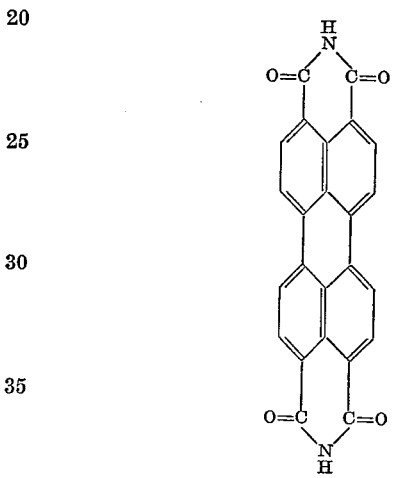

3,4,9,10-perylenetetracarboxylic-3,4,9,10-diimide (C.I.71,130)

Example XII

To a mixture of 112 grams of triethylene glycol, 20 ml. of methanol, and 140 grams of powdered potassium hydroxide heated to 140° C., were added 80 grams of benzanthronylaminoanthraquinone (obtained from the condensation of a-aminoanthraquinone and 3-bromobenzanthrone). The addition was made slowly over a period of about 1 hour, after which the mixture was further agitated and heated to 150° C. for 3½ hours. The reaction mixture was cooled to 120° C., diluted with 100 ml. of water and drowned in 1500 ml. of water. The diluted mixture was aerated at 55° C. for 2 hours and the precipitate was recovered by filtration and washed alkali free wihout subsequent purification. A dye paste prepared from the filter cake gave cotton dyeings having good wash and light fastness, and resistance to chlorine and sublimation. The product obtained in good yield had the following probable structure:

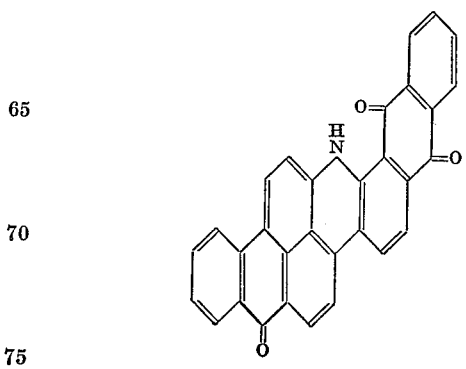

Anthra[2,1,9-m n a]napth[2,3-h]acridine-
5,10,15-(16H) trione (C.I. 69,500)

Example XIII

To a solution containing 224 grams of triethylene glycol and 12 ml. of methanol, heated to 80° C., 80 grams of KOH were added. This mixture was agitated and heated to 140° C. for 30 minutes and then 80 grams of 3,9-bis(1,1'-anthraquinonylamino)benzanthrone were added. The agitation and heating at 140° to 145° C. were continued for 2 hours. The mixture was then cooled and diluted with 1200 ml. of water. Then 600 grams of sodium chloride were added and the mixture was further diluted with 1200 ml. of water. The diluted mixture was aerated at 65° and 70° C. for 18 hours and then filtered. The filter cake was washed alkali free and dispersed into a dye paste without further purification. It dyed cotton fabric olive green, and the dye strength, shade, and solubility were excellent. The dye possessed the probable structure.

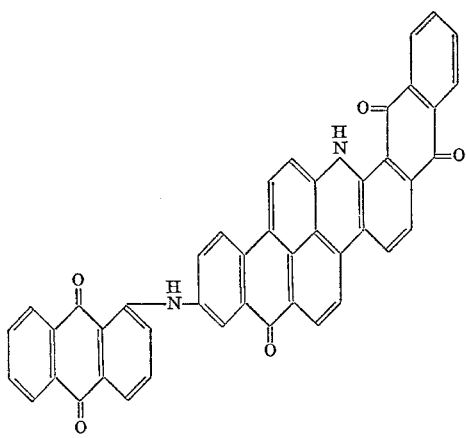

11-(1-anthraquinonylamino)-anthra[2,19-m n a]
naphth[2,3-h] acridine-5,10,15-trione (C.I. 69,525)

Examples 1 to 5, 9, 11, 12 and 13 illustrate the high quality of product obtained by employing the solvents of this invention while eliminating the purification step.

Examples 6 to 8 illustrate that lower related glycols are ineffective in this process.

Although certain preferred embodiments of the invention have been disclosed for purpose of illustration, it will be evident that various changes and modifications may be made therein without departing from the scope and spirit of the invention.

We claim:
1. In the process of producing a polycyclic organic compound selected from the group consisting of vat dyestuffs and pigments by the caustic fusion of an organic intermediate polycyclic compound of the benzanthrone, anthraquinone and pyridone series having a lesser number of rings than said polycyclic organic compound whereby said organic intermediate is cyclicized and dehydrogenated by heating with caustic alkali, the improvement which comprises effecting said caustic fusion in the presence of a solvent selected from the group consisting of triethylene glycol, polyethylene glycols having a molecular weight within the range of about 200 to 600 and lower hydrocarbon alkyl ethers thereof containing 1 to 4 carbon atoms in the alkyl chain.

2. In the process of producing a polycyclic organic compound selected from the group consisting of vat dyestuffs and pigments by the caustic fusion of an organic intermediate polycyclic compound of the benzanthrone, anthraquinone and pyridone series having a lesser number of rings than said polycyclic organic compound whereby said organic intermediate is cyclicized and dehydrogenated by heating with caustic alkali, the improvement which comprises effecting said caustic fusion in the presence of a solvent selected from the group consisting of polyethylene glycols having a molecular weight within the range of about 200 to 600.

3. The process of claim 1 wherein said solvent is a polyethylene glycol ether.

4. The process of claim 1 wherein said solvent is a polyethylene glycol having an average molecular weight of 200.

5. The process of claim 1 wherein said solvent is an alkyl ether of a polyethylene glycol having an average molecular weight of 350.

6. The process of claim 1 wherein said solvent is triethylene glycol.

7. The process of claim 1 wherein about 2 to about 4 parts by weight of said solvent per part of said organic intermediate compound is employed.

8. The process of claim 1 conducted within the temperature range of about 135° to about 200° C.

9. The process of claim 1 wherein said intermediate polycyclic organic compound is a benzanthrone.

10. The process of claim 1 wherein said intermediate polycyclic organic compound is an anthraquinone.

11. The process of claim 1 wherein said intermediate polycyclic organic compound is a pyridone.

12. The process of claim 1 wherein said polycyclic intermediate is benzanthrone and the polycyclic product is violanthrone.

13. The process of claim 1 wherein said polycyclic intermediate is dibenzanthronyl sulfide and the polycyclic product is isoviolanthrone.

14. The process of claim 1 wherein said polycyclic intermediate is 2-amino-anthraquinone and the polycyclic product is indanthrone.

15. The process of claim 1 wherein said polycyclic intermediate is naphthalimide and the polycyclic product is 3,4,9,10-perylene-tetracarboxylic-3,4,9,10-diimide.

16. The process of claim 1 wherein said polycyclic intermediate is benzanthronylaminoanthraquinone and the polycyclic product is anthra[2,1,9-m n a]naphth[2,3-h]acridine-5,10,15-(16H)-trione.

17. The process of claim 1 wherein said polycyclic intermediate is 3,9-bis(1-1'-anthraquinonylamino) benzanthrone and the polycyclic product is 11-(1-anthraquinonylamino)-anthra[2,1,9-m n a]naphth[2,3-h]acridine-5,10,15-trione.

18. In a process of forming violanthrone by the caustic fusion of benzanthrone wherein said benzanthrone is cyclicized and dehydrogenated, the improvement which comprises effecting said caustic fusion reaction in the presence of about 2 to 4 parts by weight of a solvent selected from the group consisting of triethylene glycol, polyethylene glycols having a molecular weight within the range of about 200 to 600 and lower hydrocarbon alkyl ethers thereof containing 1 to 4 carbon atoms in the alkyl chain.

19. In a process of forming violanthrone by the caustic fusion of benzanthrone wherein said benzanthrone is cyclicized and dehydrogenated, the improvement which comprises effecting said caustic fusion reaction in the presence of about 2 to about 4 parts by weight of a solvent selected from polyethylene glycols having a molecular weight within the range of about 200 to 600.

20. The process of claim 18 wherein said solvent is a polyethylene glycol having an average molecular weight of 200.

21. The process of claim 18 wherein said solvent is triethylene glycol.

22. The process of claim 18 wherein said solvent is the methyl ether of a polyethylene glycol having an average molecular weight of 350.

(References on following page)

References Cited

UNITED STATES PATENTS

| | | | |
|---|---|---|---|
| 2,480,112 | 8/1949 | Belcher et al. | 260—274 |
| 2,855,408 | 10/1958 | Dettwyler | 260—360 |
| 2,872,459 | 2/1959 | Baum | 260—357 |

ALEX MAZEL, *Primary Examiner.*

R. J. GALLAGHER, *Assistant Examiner.*

U.S. Cl. X.R.

260—273, 274, 281, 352, 354, 357, 358, 360, 693